Aug. 1, 1967  W. LÖDIGE ET AL  3,333,827
MIXING APPARATUS
Filed Feb. 8, 1965  3 Sheets-Sheet 1

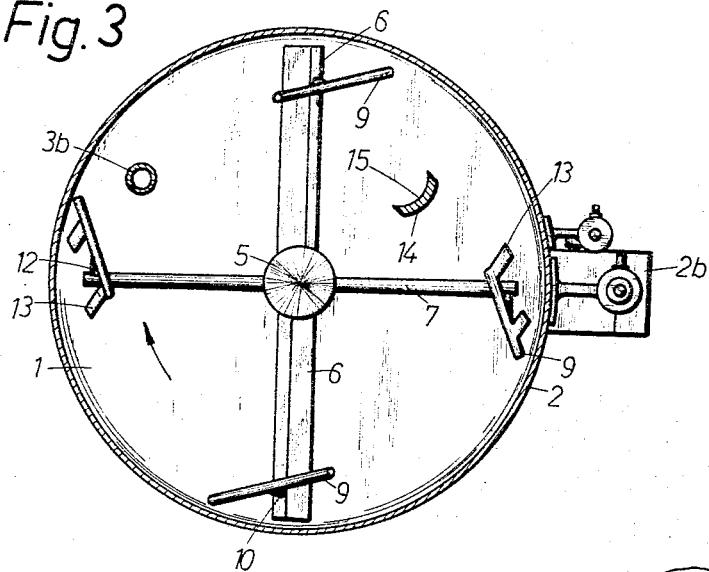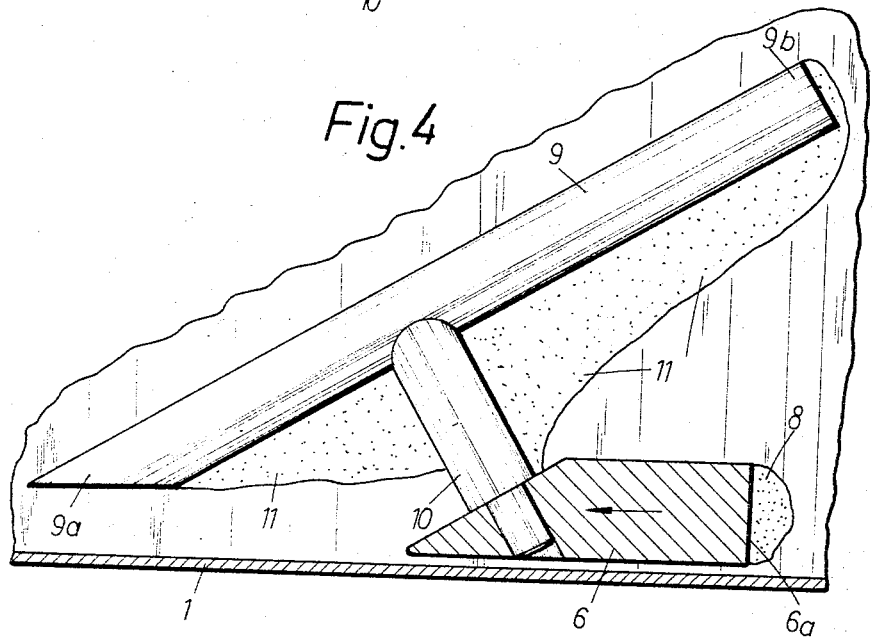

3,333,827
MIXING APPARATUS
Wilhelm Lödige, 9c Elsener Strasse; Fritz Lödige, 9b Elsener Strasse; and Josef Lücke, 13 Im Lohfeld, all of Paderborn, Germany
Filed Feb. 8, 1965, Ser. No. 431,080
Claims priority, application Germany, Feb. 13, 1964, L 47,033; Apr. 24, 1964, L 47,680
15 Claims. (Cl. 259—8)

The present invention is related to a mixture for fine-granular, pulverulent, liquid or pasty materials with a vertical cylindrical mixing vessel and a powered shaft The present invention is related to a mixer for fine-arranged concentrically therein, on which in one or several planes radial supporting arms are fastened one above the other which support mixing tools. The mixer serves in particular for the mixing of pulverulent synthetic plastic materials which are heated during the mixing process to a temperature of about 120–150° C. and which are to be mixed possibly with a plasticizer as homogeneously as possible.

When mixing fine-granular or pulverulent synthetic plastics in mixers of the aforedescribed type there arises the problem that the material to be mixed is projected centrifugally outwards toward the vessel wall by the mixing tools until said material reaches a return point and falls back slowly, braked by the centrifugal force, on a funnel-shaped trajectory towards the centre of the mixing vessel. As soon as the material again comes within the range of the mixing tools, it is accelerated centrifugally outwards and is projected against the wall of the vessel. The heating-up of the material during the centrifugal process is achieved for example by contact with the mixing tools and by the mutual friction of the material particles and by the friction of these particles against the walls of the vessel. The drawback of the known mixers with mixing tools arranged in several vertically spaced planes consists in that a substantially uniform compression of the whole of the material to be mixed in the ascending zone of the mixing vessel cannot be achieved, thus preventing a uniform heat-up of the material to be mixed. In fact, in the known mixers a portion of the material is seized by the uppermost mixing tools and is projected outwards, where said material prematurely re-enters the ascending zone, in which above the mixing tools it is not subjected to a thorough kneading or whirling so that no friction between the particles takes place. However, the portion of the material to be mixed falling through the uppermost mixing tools is seized only by tools located further downwards and is projected outwards, so that during its ascending motion it comes into contact with several tools and is thus better kneaded through. Accordingly, this portion of the material is heated-up more strongly. Above the mixing tools, the material in the ascending zone is simply pushed upwards without substantial intrinsic friction, until it reaches the return point and slides downwards again within the downwardly directed funnel. A mixing of the material portions heated to different temperatures does not take place here. A further drawback of the known mixers consists in that an excessive amount of air is held within the material during the mixing process which air hinders the advantageous friction of the particles of the material to be mixed and thus slows down the heating of the material. A further substantial disadvantage of the known mixers is that the material is excessively compressed in the proximity of the side walls of the vessel and near the ends of the rotating mixing tools by the centrifugal force exerted therein, with detrimental effects. In such zones, the material is heated up to a greater extent than in the other zones and agglomerates prematurely, while the remainder of the material is still in the pulverulent state. For this reason, a uniform final product cannot be obtained.

It has already been attempted to avoid damage to the material to be mixed due to excessive compression of said material in the particularly dangerous transition zone between the vessel wall and the bottom of the vessel by arranging upwards-directed guide plates on the supporting arms of the mixing tool. This, however, does not achieve a relief of the load on the leading edge of the tool arm, but merely a more rapid vertical circulation of the material to be mixed. The material is pressed upwards in the compressed state so that practically no mixing takes place with the less compressed particles.

It is an object of the present invention to avoid the aforedescribed drawbacks of the known mixers and to provide an improved mixer. Further objects of the present invention and advantages thereof will become apparent as the description proceeds.

According to the present invention, in the mixer of the type mentioned hereinabove on each of the radial arms of the mixing tool, near to the outer end thereof, there is arranged at least one straight or curved cross-bar in such a manner that its rear end is higher and more remote from the vessel wall than its front end, i.e. the cross-bars are at an acute angle in relation to both the bottom and the side wall of the mixing vessel in such a manner that their rear ends are at a greater distance from the side wall and from the bottom of the mixing vessel than their front ends. These cross-bars effect that the material projected by the centrifugal force against the wall of the vessel is partly deflected on the inner side of the ascending ring of material and is pushed upwards with acceleration in a broad layer. The centrifugal force within the material to be mixed acts against this deflecting movement, so that there is achieved in addition above the cross-bars an approximately vertical movement of the material with a substantially uniform compression in the course of which the particles of the material to be mixed are advantageously intensively mixed through so that in addition to the heating effect produced by friction against the mixing tool they heat up further owing to mutual friction. Preferably, the cross-bars are arranged in such a manner that their front ends at least partly are close to the comer between the side wall and the bottom of the mixing vessel thus producing the advantageous effects in that part of the mixing vessel where the greatest compression of the material to be mixed occurs.

Since according to a preferred embodiment of the present invention the cross-bars are arranged in two planes above each other, there is effected a double compulsory mixing of the material up to a height far exceeding the middle of the vessel. By the time the whirled mixture has quietened down, it has almost reached the highest point of its trajectory and falls back downwards in the vessel in the form of a funnel-shaped whirlpool. The lower cross-bars of the mixing tool are carried by centrifugal arms which extend horizontally close to the bottom of the mixing vessel and are substantially of blade-shape and which press the material resting on the bottom of the vessel upwards and bring it at least partly within the range of the cross-bars. The upper cross-bars are supported by arms which slope from close to the bottom of the mixing vessel upwards from the hub or nave of the shaft outwards towards the wall of the vessel, since this arrangement facilitates the downward fall of the material. The centrifugal force exerted on the material by the rotating upwardly sloped arms in the zone of the downwardfalling material is very slight, so that after being deflected in direction of the vessel wall the portions of the material concerned fall immediately out of the range of these supporting arms and down to the bottom of the vessel.

For this reason it becomes possible to connect these supporting arms with the shaft very close to the bottom of the vessel. The upper supporting arms may even be fastened to the hub or shaft at the same height as the lower supporting arms, since the supporting arms carrying the cross-bars located in different planes are arranged in staggered or set-off relationship to each other. The oblique positioning of the carrier arms for the upper cross-bars has the further advantage that the downward-falling material is seized by them only shortly before reaching the bottom of the vessel.

In a further preferred embodiment, the cross-bars are arranged above a connecting piece acting as spacer and are held on the mixing tool arms with their points inclined towards the bottom of the vessel. The precise angular position can be selected according to the nature of the material to be processed and of the maximum speed of rotation of the mixing tools. Advantageously, each cross-bar should slope upwards and to the rear at an angle of between 35 and 45°. The point of each cross-bar should be at a distance corresponding to 1–5%, and the end of the same cross-bar at a distance corresponding to 10–25% of the vessel diameter from the vertical wall of the vessel. The downward-pointing end of each cross-bar terminates at a distance in front of the corresponding supporting arm close to the wall of the vessel. Owing to this, the cross-bars, of small cross-sectional area, will always project into the zone of greatest compression of the material to be mixed and prevent an excessive compression at the vessel wall by deflecting portions of said material further into the interior of the vessel. It is achieved hereby simultaneously that a broader, higher and more uniformly compressed ascending mixing zone is created. This arrangement has the further advantage whereby the contiguous ends of the carrier arms, which likewise seize the material and push it upwards, are not subjected to an excessive load and thus cannot provoke an excessive compression and heating of the material located between the carrier arm ends and the wall of the vessel, in particular in the corner between the bottom and the wall of the vessel. The front end of each cross-bar preferably tapers to a wedge, thus giving a better lifting-off action to said end. When the cross-bars are correctly arranged on the lower supporting arms, it is possible to employ mixing vessels with only slightly-rounded corners between bottom and wall, without impairing the mixing process, which facilitate the discharge of the vessel and which lower the cost of the mixing process.

According to a preferred embodiment of the invention, each of the cross-bars is supported on the relevant carrier arm by means of a spar or rod-shaped spacer element. By this means the front end of each of the cross-bars may terminate and rotate at the desired distance in front of the centrifugal or supporting arm concerned. Moreover, there is obtained the additional advantage whereby, viewed on the direction of rotation, there is formed behind the cross-bar and the spacer element supporting it a zone with low pressure or a zone containing less solid material to be mixed, i.e. the solid material is compressed in front of the cross-bar while the air may readily flow past the cross-bar and collects in the zone behind the cross-bar and the spacer. Thus, this zone effects that the air contained in the material located in proximity as well as the moisture are sucked out of said material and are conducted into the less compressed zone located between the ascending and descending material zone, since the less compressed space closes behind each of the cross-bars by the advance of the cross-bar point and by reason of the compression of the material decreasing from the wall of the vessel in direction of the interior. The elimination of the air in turn has the advantage that the mutual friction of the material particles is not hindered by inclusions of air, so that they can heat up advantageously primarily due to this effect. There is also obtained the additional advantage whereby the plasticizer can penetrate the plastic particles easier and deeper after evacuation of the air. Here, it is only important that the low-density zone located behind the cross-bars does not communicate freely with that part of the mixing vessel which is free from material and which contains free air.

The lower supporting arms extending close to the bottom of the vessel preferably have a wedge-shaped cross-section and have an almost vertical rear surface. By this means, there is formed during rotation of the mixing tool an air channel behind the lower arms which is practically free from material.

Through this air channel, which originates at the shaft, the air driven out of the material on pressing the cross-bars into the ascending material can flow to the empty center of the vessel where the upwards-opening vortex is located. The greater upward-conveying capacity of the mixing tools according to the invention maintains this vortex even at high loads. There thus exists during the whole of the mixing process a connection free of solid material between the rear side of the lower supporting arms and that portion of the mixing vessel which is free of material. A mixer for plastics powders has the further important task of drying the material being mixed during the mixing process, i.e. the moist air must be separated and eliminated from the material since it would re-enter it otherwise. If now the flap of the vessel lid is opened or if an air-exhaust valve or the like gas-exhaust means is arranged in the flap of the feed aperture, then the moist air expelled from the material being mixed by the mixing tool arms, which continuously flows into the air vortex, can escape through said air exhaust valve owing to the excess pressure formed in the vessel due to the temperature increase. The evacuation of the moist air can be substantially accelerated and improved when pre-warmed dry air is blown into the vessel at temperatures of between 70 and 100° C. through a laterally arranged opening, e.g. a plasticizer feed line. However, this air zone must not communicate with the low-pressure regions or regions of reduced density formed behind the cross-bars in order to preserve said zones behind the cross-bars for evacuation of the air contained in the material being mixed.

For this reason, the spacer elements or distance pieces for the cross-bars are fastened according to the invention to the respective carrier arms at a greater, i.e. sufficient distance from the rear edges of these, either directly or, if necessary or desired, through a further intervening secondary spar. This also applies to those cross-bars which are arranged on the upper carrier arms because on these carrier arms there likewise forms a material-free zone on the rear side, which always communicates with the air space in the mixing vessel.

In order to further improve the mixing and whirling of the material, there are arranged in a further preferred embodiment at least on the upper cross-bars of the mixing tool arms guide bodies or means pointing upwards and towards the wall of the vessel, said guide bodies being blade- or knife-shaped and effecting a strong vertical conveying of the material up to a region below the lid of the vessel even at smaller loads. When these guiding bodies are blade-shaped and are arranged as knives, they will comminute coarse, destructible agglomerates of the material to be mixed. It is also possible to provide several cross-bars of the type proposed according to the invention one beside the other on each of the carrier arms, whereby the zone of uniform compression and whirling movement of the material to be mixed is further extended. The improved vertical conveying accelerates the vertical circulation of the material and, in addition, the inner face of the lid of the vessel is also swept which acts against the formation of deposits thereon.

The cross-bars, spacer elements, etc., have preferably a circular cross-section, however, any other profiles may also be employed.

On the inner face of the lid of the mixing vessel there is preferably arranged a deflecting blade which has a concave working surface and projects vertically into the mixing vessel to about half of the height of said vessel and is at a distance from the vessel wall which corresponds to 10–16% of the vessel diameter.

Owing to the centrifugal force still present in this material, the return flow towards the bottom of the vessel is braked and thus slowed down. When a deflecting blade according to the invention is correctly positioned, the ring of material is continuously "peeled" on the inside and is deflected. The deflected portions of material then fall in the manner of a cataract through the vortex of air in the centre of the vessel very rapidly to the bottom, without destroying said vortex. The vertical circulation of the material to be mixed is thereby advantageously greatly accelerated and the mixing effect is substantially improved.

According to another preferred embodiment of the present invention the deflecting means is a body tapering to a wedge in direction of rotation of the mixing tools and having a front side concavely arched inward opposite to the direction of rotation of the mixing tool or of the material being mixed, where on the lateral edge of the deflector body facing the vessel wall there are fastened above each other several concavely arched flat irons extending as an extension of the front side opposite to the direction of rotation of mixing tools towards the vessel wall which serve as grabs. The grabs arranged one above the other are preferably of different lengths, the lowermost being the shortest and the uppermost being the longest. The deflector constructed in this manner effects that the material rotating within the vessel and pressed or pushed upwards along the side wall is separated from the side wall at a certain distance and falls towards the centre of the vessel in direction of the drive shaft of the mixing tools, without the regularity of the circulation of the material being impaired. The deflector is so shaped and constructed that substantially no material adheres to its rear side. It also accommodates lines for measuring instruments and feeding devices for liquids and/or hot air. The flat irons arranged in the extension of the front side of the deflector, which act as grabs, effect that the material set in rotary motion by the mixing tools which reach to only about half the height of the vessel is not undulating, i.e. irregular in its circulation. It has been found in this connection that an undulating circulation leads to considerable variations in power consumption which unfavourably affect the orderly running of the machine. Output variations amounting to 20 amps may occur.

Owing to the arrangement of the grabs proposed according to the invention, which are spaced one above the other, a regular circulation of the material is brought about and in addition the mixing effect is increased. Once the material being mixed has left the mixing zone proper in the ascending zone in which it is strongly mixed, portions of the material are removed from the ascending rotating material ring, are deflected and returned to the bottom of the vessel. The different length of the flat irons arranged above each other effects that the material ascending along the side wall gradually comes within the range of the deflector or of its flat irons, so that the main stream of material does not fall back prematurely to the centre of the mixing vessel. In another embodiment of the invention, a temperature-sensor is arranged within the deflector body which projects outwards therefrom near the lower end of the deflector on the side facing the lateral wall of the vessel. The sensor is directed obliquely downwards, at an acute angle to the wall of the vessel. The sensor projects forwards from the deflector in such a direction that the rotating and upwards-pushed material falls practically vertically on the point of the sensor. It is avoided hereby that the material deposits on dead zones of the sensor and forms a heat-insulating layer which would render impossible a substantially delay-free and precise indication of the thermometer. The measuring line of the remote thermometer passes through the hollow space of the deflector.

In a preferred further development of the invention, the deflector accommodates feed lines for liquids and/or gases which project outwards from the rear end of the deflector substantially parallel to the radius of the mixing vessel and are inclined downwards, so that they form an acute angle in relation to the lateral wall of the vessel. It is achieved hereby that the material being mixed sweeping past the deflector draws along the liquid or the corresponding gas issuing from the feed line and, owing to the high velocity of the material of for example 10 m./sec., finely distributes it in the material being mixed. Since the feed lines open in the direction of rotation of the material, the material cannot settle on the ends of the feed lines nad certainly cannot enter these. Rather, owing to the relative motion of the material there is created a suction at the ends of the feed lines which draws the liquid or the gas through in by the lines. The feed lines open preferably into a common duct or originates from such a duct to which separate feed lines are connected through valves, for the liquids and gases respectively. This gives the possibility of introducing through the feed lines liquids or gases at will or any desired liquid-gas mixture. The common duct is of sufficient length to produce this mixture.

If warm or hot air is blown through the feed lines into the vessel this air is compelled to traverse, by reason of the downwards-directed feed pipes, the horizontally rotating material sweeping past the feed pipe in direction of the wall of the vessel, before it can ascend in the center of the vessel. A free-from-material-to-be-mixed zone is formed here, so that the air or another gas can escape through an air-exhaust valve arranged in or on the lid of the mixing vessel, without drawing along particles of the material being mixed.

If the material to be mixed is moist a good drying thereof can be achieved within a short time by feeding it warm or hot air.

To achieve a precise setting of the deflector proposed according to the invention, said deflector may for example be supported through an eccentric located in the lid so as to be radially adjustable within the mixing vessel. The distance between the deflector and the side wall of the vessel can be adjusted according to the position of the eccentric.

The drawing illustrates examples of embodiment of the mixer according to the present invention:

FIG. 3 is a top view of an open mixing vessel, i.e. view III of FIG. 1;

FIG. 4 is an enlarged view of a cross-bar fastened to a wedge-shaped supporting arm;

Figure 1:
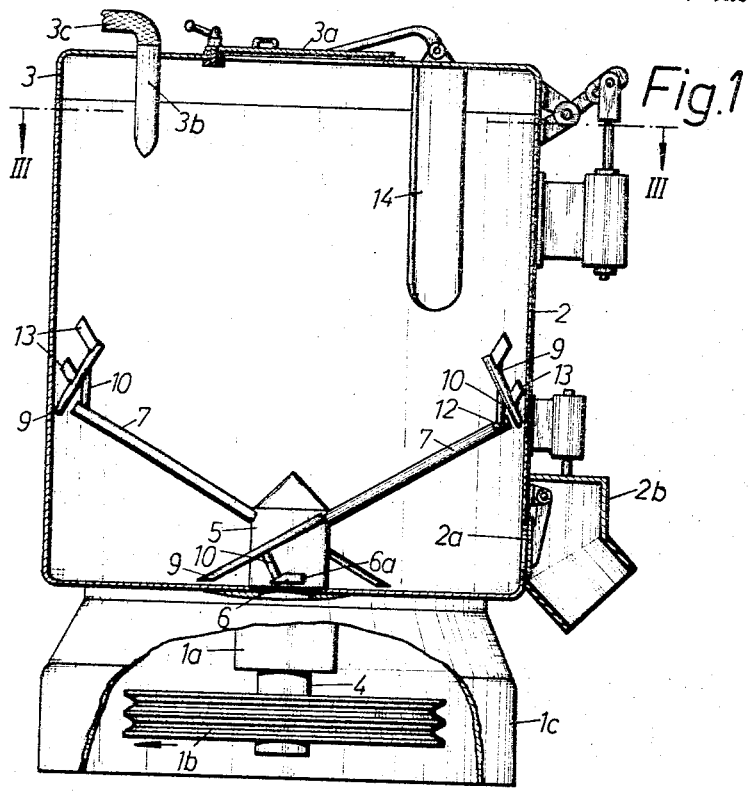
FIG. 1 shows a mixer without the front portion of the mixing vessel with the mixing tools in a certain position.
Figure 2:
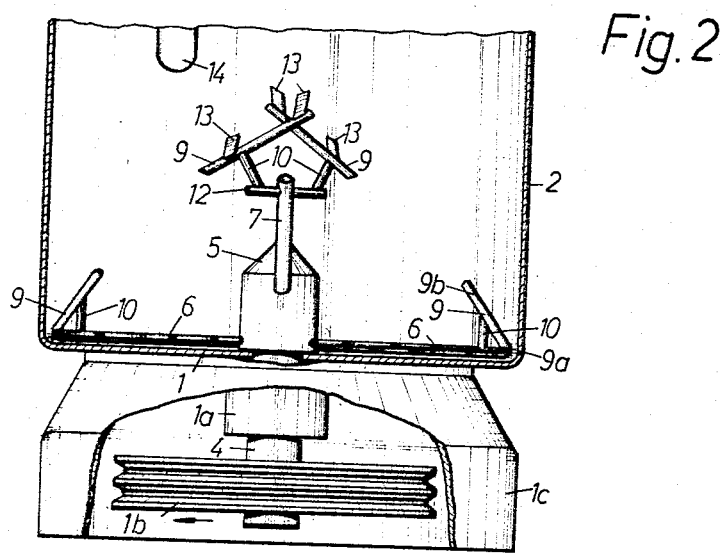
FIG. 2 shows a view similar to that of FIG. 1, but with mixing tools rotated by 90°.

The mixer according to the invention has a mixing vessel with the bottom 1, a cylindrical side wall 2 and a lid 3. In the centre of the lid 3 a feed aperture for dry substances is closed by the flap 3a. In the embodiment of FIGS. 1 to 3, to one side of the flap there is arranged a pipe 3b with a tube attachment 3c, said pipe projecting into the interior of the mixer, to act as liquid inlet. Close above the bottom an outlet opening closed with a flap 2a is provided in the side wall 2. The flap 2a is covered by a casing 2b with an outlet attachment. Both the lid 3 and the outlet flap 2a are operable hydraulically by means of a cylinder, a piston arranged movable therein and a lever or rod fastened to the piston and to the lid or, respectively, the outlet flap. A shaft 4 projects through the bottom concentrically and vertically said shaft terminating in a pointed nave 5. The shaft is mounted in the housing 1a and carries on its lower end a belt pulley 1b as a drive means. The support of the mixer is designated by 1c.

Two pairs of radially extending arms, 6 and 7, are fastened to the nave 5. The arms 6 extend close above the bottom and, viewed in the direction of rotation, their front edges taper to a wedge. Their rear side 6a is vertical or is slightly arched outwards. During rotation of the arms 6 in the course of the mixing process the material is lifted off the bottom 1 by the arms 6 and is pushed upwards. On the rear side of the arms 6 there then forms a zone 8 which is practically free of the material to be mixed. This zone 8 extends to the nave 5 and communicates with the air-space of the vessel since the material pressed upwards along the vessel walls 2 falls from above towards the nave 5 while assuming the shape of a funnel but always leaves free a vortex of air in the centre of the vessel.

Close to the outer end of the arms 6 there is fastened—by way of example—a straight cross-bar 9 through a rod-shaped spacer element 10. Each of the cross-bars 9 is at a slight distance with its leading point 9a from the wall 2 of the vessel, while its rear end 9b is at a greater distance from the wall 2, advantageously 15% of the vessel diameter. In addition, the rearwards ascending cross-bar 9 is at an angle to the bottom 1 of the vessel, so that in the course of the mixing process it guides the material to be mixed upwards and inwards. I.e., the cross-bars are at an acute angle both to the bottom and to the side wall of the mixing vessel. The front end 9a of the cross-bar 9, which, when viewed in the direction of rotation, terminates in front of the carrier arm 6 concerned, tapers to a wedge in order to facilitate the lifting-off of the material from the vessel wall.

During rotation of the mixing tool, there is formed on the rear side of the cross-bars 9 and of the spacers 10 carrying them a low-pressure or low density zone 11 which facilitates the removal of the air contained in the material to be mixed. This zone 11 should not communicate with the air zone 8 located on the rear side of the carrier arms 6. The obliquely upwards extending carrier arms 7 have a circular cross-section. At their outer end there is fastened at right angles a rod 12, which carries in a manner similar to the arms 6 a spacer 10 for a further cross-bar 9. The cross-bars linked to the arms 7 are arranged in the same manner as the cross-bars carried by the arms 6. In the schematically illustrated embodiment however, the upper cross-bars 9 are additionally provided with knife-shaped guiding bodies 13 which point obliquely upwards in direction of the wall of the vessel. These guiding bodies 13 promote the thorough blending of the material.

A low-density zone 11 here not shown in detail also forms on the rear side of the cross-bars 9 connected to the carrier arms 7. This zone however may not communicate with the air-zone forming, in a manner here not shown, behind the carrier arms 7. For this reason, the spacers 10 are fastened to the spars 12 which maintain them at a distance from the carrier arms 7.

From the lid 3 there projects vertically into the vessel down to about half its height a deflector blade 14 for the material driven upwards. This blade 14 does not rotate and has on its side facing the upwards-projected and rotating material a concave working surface 15. By this means, the return movement of the material to be mixed is promoted by a more rapid fall of the material in direction of the nave 5 of the drive shaft 4.

Figure 5:
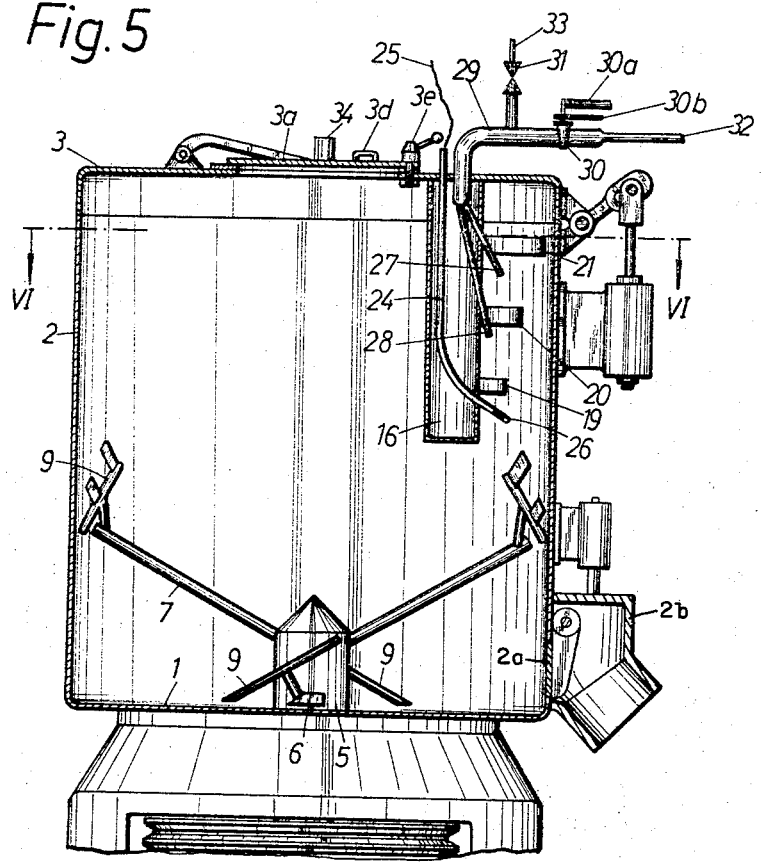
FIG. 5 shows another mixer without the front portion of the mixing vessel, having a different embodiment of the deflector means in longitudinal section.
Figure 6:
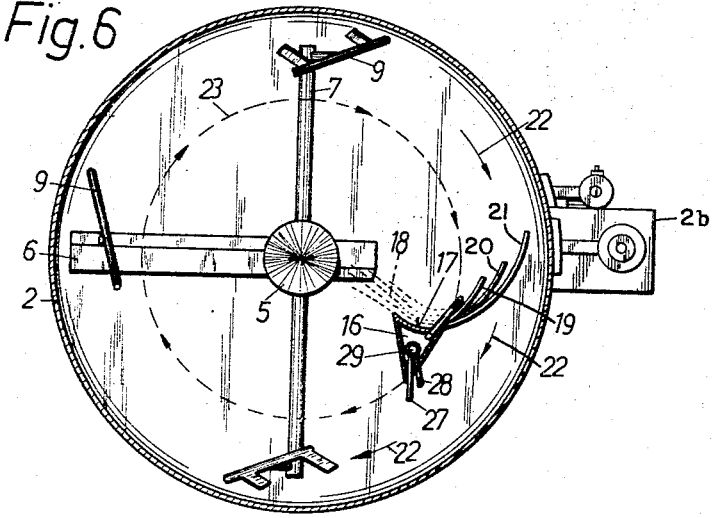
FIG. 6 is a top view of the mixer of FIG. 5, with the lid removed, i.e. view VI of FIG. 5, wherein the deflector is shown in its operating position and the supporting arm located thereunder is not shown.

In the embodiment illustrated in FIGS. 5 and 6, on the inside of the lid 3 next to the flap 3a, a deflector body 16 projecting downwards into the mixing vessel is supported so as to be eccentrically adjustable in direction of the side wall 2. This deflector 16 tapers in the direction of rotation of the material to a wedge, and it forms on its front side a concavely inward-arched working surface 17. This working surface separates the rotating material at a certain distance from the vessel wall 2 and guides it in the direction of the arrows 18 back to the centre of the mixing vessel where it falls downwards in the direction of the nave 5. On the lateral edge of the working surface 17 located nearest to the side wall 2 there are arranged three concavely curved flat irons 19, 20 and 21 one above the other which act as grabs for the material to be mixed, of which the lowest grab 19 is the shortest and the uppermost grab 21 is the longest. The flat irons or grabs extend practically as extensions of the concavely inward-arched working surface 17. Their purpose is to increase the mixing efficiency and to prevent an undulating and thus irregular circulation of the material being mixed. The direction of rotation of the mixing tools 9 is indicated by the arrows 22. The rotating ring of material itself is indicated by the circle 23 drawn in broken lines and provided with arrowheads.

The hollow deflector body 16 accommodates the conduit 24 of an electrically indicating thermometer which is connected by a cable 25 with an indicator device here not shown. At the end of the conduit 24 of the thermometer, a sensor 26 is arranged which projects from the deflector 16 into the mixing vessel. This sensor 26 projects obliquely downwards and points at an acute angle towards the side wall 2 of the mixing vessel.

It is achieved hereby, that the rotating and simultaneously upwards-pressed material falls practically vertically on the point of the sensor 26, so that no deposit of material forms on the sensor and no vacuum can form behind the sensor. Since the sensor projects into the material being mixed at a point where said material is not within the range of the mixing tools, this yields a very precise and substantailly delay-free indication of the effective material temperature.

In addition, the deflector body 16 accommodates two inlet pipes 27 and 28 for liquids such as plasticizers and the like and/or gases, such as hot air or similar. The inlet pipes 27 and 28 terminate above each other at the rear end of the deflector 16 and point obliquely downwards, as shown in particular in FIG. 5. In the top view of FIG. 6, the inlet pipes 27 and 28 point at an acute angle towards the side wall 2 of the mixing vessel and they are located substantially parallel to the radius of the vessel in a staggered arrangement. The two inlet pipes 27 and 28 open into a common conduit 29. To this conduit there are connected through valves 30 and 31 separate feed pipes for liquids and gases, respectively 32 and 33. The cock valve 30 can be adjusted in a known manner by means of a lever 30a. The position of the cock can be controlled by means of a graduated disc 30b. The conduit 29 serves both as an ante chamber for the pipes 27 and 28 and as a mixing chamber for liquid-gas mixtures when required.

The inlet pipes 27 and 28 project outwards from the deflector 16 in such a manner that for example the plasticizer flowing from them is sucked out and is uniformly distributed as a very thin layer on the very rapidly rotating material. The suction thus produced in the pipes 27 and 28 prevents the material from penetrating into these pipes.

An air-exhaust valve 34 is provided in the centre of the flap 3a for evacuating the air passed into the vessel serving for example for drying the material being mixed.

What we claim is:

1. A mixer for fine-granular, pulverulent, liquid, and pasty materials comprising, in combination, a vertical cylindrical mixing vessel being closable by a lid means and having a closable feed aperture in its upper part and a closable discharge aperture close to its bottom, a shaft vertically and concentrically arranged therein, a drive means for said shaft, radially arranged supporting arms on said shaft extending with their outer ends close to the side wall of said mixing vessel, and cross-bars on said supporting arms close to their outer ends which cross-bars are at an acute angle in relation to both the bottom and the side wall of said mixing vessel in such a manner that their rear ends are at a greater distance from the side wall and from the bottom of said mixing vessel than their front ends and that said front ends terminate at a distance in front of their supporting arms close to the side wall of said mixing vessel.

2. A mixer for fine-granular, pulverulent, liquid, and pasty materials comprising, in combination, a vertical cylindrical mixing vessel being closable by a lid means and having a closable feed aperture in its upper part and a closable discharge aperture close to its bottom, a shaft vertically and concentrically arranged therein, a drive means for said shaft, radially arranged supporting arms on said shaft extending with their outer ends close to the side wall of said mixing vessel, and cross-bars on said supporting arms close to their outer ends which cross-bars are at an acute angle in relation to both the bottom and the side wall of said mixing vessel in such a manner that their rear ends are at a greater distance from the side wall and from the bottom of said mixing vessel than their front end and that said front ends terminate at a distance in front of their supporting arms close to the side wall of said mixing vessel and at least partly are close to the corner between the side wall and the bottom of said mixing vessel.

3. A mixer for fine-granular, pulverulent, liquid, and pasty materials comprising, in combination, a vertical cylindrical mixing vessel being closable by a lid means and having a closable feed aperture in its upper part and a closable discharge aperture close to its bottom, a shaft vertically and concentrically arranged therein, a drive means for said shaft, two groups of supporting arms on said shaft extending with their outer ends close to the side wall of said mixing vessel, the one group of supporting arms extending horizontally close to the bottom of said mixing vessel and being substantially of blade-shape and the other group of supporting arms sloping from close to the bottom of said mixing vessel upwards from the nave of said drive shaft towards the side wall of said mixing vessel, and cross-bars on said supporting arms close to their outer ends which cross-bars are at an acute angle in relation to both the bottom and the side wall of said mixing vessel in such a manner that their rear ends are at a greater distance from the side wall and from the bottom of said mixing vessel than their front ends.

4. A mixer for fine-granular, pulverulent, liquid, and pasty materials comprising, in combination, a vertical cylindrical mixing vessel being closable by a lid means and having a closable feed aperture in its upper part and a closable discharge aperture close to its bottom, a shaft vertically and concentrically arranged therein, a drive means for said shaft, two groups of supporting arms on said shaft extending with their outer ends close to the side wall of said mixing vessel, the one group of supporting arms extending horizontally close to the bottom of said mixing vessel and being substantially of blade-shape and the other group of supporting arms sloping from close to the bottom of said mixing vessel upwards from the nave of said drive shaft towards the side wall of said mixing vessel, and cross-bars on said supporting arms close to their outer ends which cross-bars are at an acute angle in relation to both the bottom and the side wall of said mixing vessel in such a manner that their rear ends are at a greater distance from the side wall and from the bottom of said mixing vessel than their front ends, an inlet conduit for adding liquids and gases to the mix, and a gas-exhaust means in said lid means for closing said mixing vessel.

5. A mixer for fine granular, pulverulent, liquid, and pasty materials comprising, in combination, a vertical cylindrical mixing vessel being closable by a lid means and having a closable feed aperture in its upper part and a closable discharge aperture close to its bottom, a shaft vertically and concentrically arranged therein, a drive means for said shaft, two pairs of supporting arms on said shaft extending with their outer ends close to the side wall of said mixing vessel, the members of each pair being arranged opposite to each other and said pairs being set off in relation to each other, the one pair of supporting arms extending horizontally close to the bottom of said mixing vessel and being substantially of blade-shape and the other pair of supporting arms sloping from close to the bottom of said mixing vessel upwards from the nave of said drive shaft towards the side wall of said mixing vessel, and cross-bars on said supporting arms close to their outer ends which cross-bars are at an acute angle in relation to both the bottom and the side wall of said mixing vessel in such a manner that their rear ends are at a greater distance from the side wall and from the bottom of said mixing vessel than their front ends.

6. A mixer for fine-granular, pulverulent, liquid, and pasty materials comprising, in combination, a vertical cylindrical mixing vessel being closable by a lid means and having a closable feed aperture in its upper part and a closable discharge aperture close to its bottom, a shaft vertically and concentrically arranged therein, a drive means for said shaft, two pairs of supporting arms on said shaft extending with their outer ends close to the side wall of said mixing vessel, the members of each pair being arranged opposite to each other and said pairs being set off in relation to each other, the one pair of supporting arms sloping from close to the bottom of said mixing vessel upwards from the nave of said drive shaft towards the side wall of said mixing vessel, and cross-bars on said supporting arms close to their outer ends which cross-bars are at an acute angle in relation to both the side wall and the bottom of said mixing vessel in such a manner that their rear ends are at a greater distance from the side wall and from the bottom of said mixing vessel than their front ends and that said front ends terminate at a distance in front of their supporting arm with respect to the direction of rotation and close to the side-wall of said mixing vessel.

7. A mixer for fine-granular, pulverulent, liquid, and pasty materials comprising, in combination, a vertical cylindrical mixing vessel being closable by a lid means and having a closable feed aperture in its upper part and a closable discharge aperture close to its bottom, a shaft vertically and concentrically arranged therein, a drive means for said shaft, two pairs of supporting arms on said shaft extending with their outer ends close to the side wall of said mixing vessel, the members of each pair being arranged opposite to each other and said pairs being set off in relation to each other, the one pair of supporting arms extending horizontally close to the bottom of said mixing vessel and being substantially of blade-shape and the other pair of supporting arms sloping from close to the bottom of said mixing vessel upwards from the nave of said drive shaft towards the side wall of said mixing vessel, and cross-bars on said supporting arms close to their outer ends which cross-bars are held by means of rod-like distance pieces at a distance above their supporting arm and are at an acute angle in relation to both the side wall and the bottom of said mixing vessel in such a manner that their rear ends are at a greater distance from the side wall and from the bottom of said mixing vessel than their front ends and that said front ends terminate at a distance in front of their supporting arm close to the side wall of said mixing vessel and that the front ends of the cross-bars on the supporting arms extending close to the bottom of said mixing vessel terminate close to the corner between the bottom and the side wall of said mixing vessel.

8. A mixer for fine-granular, pulverulent, liquid, and pasty materials comprising, in combination, a vertical cylindrical mixing vessel being closable by a lid means and having a closable discharge aperture close to its bottom, a shaft vertically and concentrically arranged therein, a drive means for said shaft, two pairs of supporting arms on said shaft, extending with their outer ends close to the side wall of said mixing vessel, the members of each pair being arranged opposite to each other and said pairs being set off in relation to each other, the one pair of supporting arms extending horizontally close to the bottom of said mixing vessel and being of blade-shape and the other pair of supporting arms sloping from close to the bottom of said mixing vessel upwards from the nave of said drive shaft towards the side wall of said mixing vessel, and cross bars on said supporting arms close to their outer ends which cross-bars are at an acute angle in relation to both the side wall and the bottom of said mixing vessel in such a manner that their rear ends are at a greater distance from the side wall and from the bottom of said mixing vessel than their front ends, and knife-like guiding bodies on the upper cross-bars, said guiding bodies pointing towards the side wall of said mixing vessel.

9. A mixer for fine-granular, pulverulent, liquid, and pasty materials comprising, in combination, a vertical cylindrical mixing vessel being closable by a lid means and having a closable feed aperture in its upper part and a closable discharge aperture close to its bottom, a shaft vertically and concentrically arranged therein, a drive means for said shaft, two pairs of supporting arms on said shaft extending with their outer ends close to the side wall of said mixing vessel, the members of each pair being arranged opposite to each other and said pairs being set off in relation to each other, the one pair of supporting arms extending horizontally close to the bottom of said mixing vessel, being of blade-shape and having a wedge-shaped cross section with a substantially vertically directed rear face and the other pair of supporting arms sloping from close to the bottom of said mixing vessel upwards from the nave of said drive shaft towards said mixing wall, and cross-bars on said supporting arms close to their outer ends which cross-bars are held by means of rod-like distance pieces at a distance above their supporting arms and are at an acute angle in relation to both the side wall and the bottom of said mixing vessel in such a manner that their rear ends are at a greater distance from the side wall and from the bottom of said mixing vessel than their front ends and that said front ends terminate at a distance in front of their supporting arms close to the side wall of said mixing vessel.

10. A mixer for fine-granular, pulverulent, liquid, and pasty materials comprising, in combination, a vertical cylindrical mixing vessel being closable by a lid means and having a closable feed aperture in its upper part and a closable discharge aperture close to its bottom, a shaft vertically and concentrically arranged therein, a drive means for said shaft, two pairs of supporting arms on said shaft extending with their outer ends close to the side wall of said mixing vessel, the members of each pair being arranged opposite to each other and said pairs being set off in relation to each other, one pair of supporting arms extending horizontally close to the bottom of said mixing vessel, being of blade-shape and having a wedge-shaped cross section with a substantially vertically directed rear face and the other pair of supporting arms sloping from close to the bottom of said mixing vessel upwards from the nave of said drive shaft towards said mixing wall, cross-bars on said supporting arms close to their outer ends which cross-bars are held by means of rod-like distance pieces at a distance above their supporting arms and at an acute angle in relation to both the side wall and the bottom of said mixing vessel in such a manner that said rod-like distance pieces are fastened to their respective supporting arm closer to the front edge than to the rear edge thereof and that the rear ends of said cross-bars are at a greater distance from the side wall and from the bottom of said mixing vessel than their front ends and that said front ends terminate at a distance in front of their supporting arms close to the side wall of said mixing vessel, and knife-like guiding bodies on the upper cross-bars said guiding bodies pointing towards the side wall of said mixing vessel.

11. A mixer for fine-granular, pulverulent, liquid, and pasty materials comprising, in combination, a vertical cylindrical mixing vessel, being closable by a lid means and having a closable feed aperture in its upper part and a closable discharge aperture close to its bottom, a shaft vertically and concentrically arranged therein, a drive means for said shaft, radially arranged supporting arms on said shaft extending with their outer ends close to the side wall of said mixing vessel, and cross-bars on said supporting arms close to their outer ends which cross-bars are at an acute angle in relation to both the bottom and the side wall of said mixing vessel in such a manner that their rear ends are at a greater distance from the side wall and from the bottom of said mixing vessel than their front ends, and a deflecting means projecting in the mixing space and having a concave working surface said deflecting means being fastened to the lid means of said mixing vessel.

12. A mixer for fine-granular, pulverulent, liquid, and pasty materials comprising, in combination, a vertical cylindrical mixing vessel being closable by a lid means and having a closable feed aperture in its upper part and a closable discharge aperture close to its bottom, a shaft vertically and concentrically arranged therein, a drive means for said shaft, radially arranged supporting arms on said shaft extending with their outer ends close to the side wall of said mixing vessel, and cross-bars on said supporting arms close to their outer ends which cross-bars are at an acute angle in relation to both the bottom and the side wall of said mixing vessel in such a manner that their rear ends are at a greater distance from the side wall and from the bottom of said mixing vessel than their front ends, and a deflecting body tapering to a wedge in direction of rotation of said supporting arms, housing inlet conduit means for adding liquids and gases to the mix, having a concavely inward-arching front side and having fastened on the lateral edge facing the side wall of said mixing vessel one above the other several concavely arched grabs extending as an extension of the front side oppositely to the direction of rotation of the supporting arms towards the side wall of said mixing vessel.

13. A mixer for fine-granular, pulverulent, liquid, and pasty materials comprising, in combination, a vertical cylindrical mixing vessel being closable by a lid means and having a closable feed aperture in its upper part and a closable discharge aperture close to its bottom, a shaft vertically and concentrically arranged therein, a drive means for said shaft, radially arranged supporting arms on said shaft extending with their outer ends close to the side wall of said mixing vessel, and cross-bars on said supporting arms close to their outer ends which cross-bars are at an acute angle in relation to both the bottom and the side wall of said mixing vessel in such a manner that their rear ends are at a greater distance from the side wall and from the bottom of said mixing vessel than their front ends, and a deflecting body tapering to a wedge in direction of rotation of said supporting arms, housing inlet conduit means for adding liquids and gases to the mix, having a concavely inward-arching front side and having fastened on the lateral edge facing the side wall of said mixing vessel one above the other several concavely arched grabs extending as an extension of the front side oppositely to the direction of rotation of the supporting arms towards the side wall of said mixing vessel, and a thermometer conduit within said deflector body, said thermometer having a sensor projecting forwards close to the lower end of that side of the deflector body which faces the side wall of said mixing vessel, said sensor being directed obliquely downwards and at an acute angle in relation to the side wall of said mixing vessel, and a gas-exhaust means in said lid means for closing said mixing vessel.

14. A mixer for fine-granular, pulverulent, liquid and pasty materials comprising, in combination, a vertical cylindrical mixing vessel being closable by a lid means and having a closable feed aperture in its upper part and a closable discharge aperture close to its bottom, a shaft vertically and concentrically arranged therein, a drive means for said shaft, radially arranged supporting arms on said shaft extending with their outer ends close to the side wall of said mixing vessel, and cross-bars on said supporting arms close to their outer ends which cross-bars are arranged in two planes one above the other and are at an acute angle in relation to both the bottom and the side wall of said mixing vessel in such a manner that their rear ends are at a greater distance from the side wall and from the bottom of said mixing vessel than their front ends and that said front ends terminate at a distance in front of their supporting arms close to the side wall of said mixing vessel.

15. A mixer for fine-granular, pulverulent, liquid, and pasty materials comprising, in combination, a vertical cylindrical mixing vessel being closable by a lid means and having a closable feed aperture in its upper part and a closable discharge aperture close to its bottom, a shaft vertically and concentrically arranged therein, a drive means for said shaft, radially arranged supporting arms on said shaft extending with their outer ends close to the side wall of said mixing vessel, and cross-bars on said supporting arms close to their outer ends which cross-bars are arranged in two planes one above the other and are at an acute angle in relation to both the bottom and the side wall of said mixing vessel in such a manner that their rear ends are at a greater distance from the side wall and from the bottom of said mixing vessel than their front ends and that said front ends terminate at a distance in front of their supporting arms close to the side wall of said mixing vessel and that the front ends of the lower cross-bars terminate close to the corner between the side wall and the bottom of said mixing vessel.

References Cited

UNITED STATES PATENTS

| 59,811 | 11/1866 | Beckwith | 259—107 |
| 2,793,166 | 5/1957 | Hatch. | |
| 2,858,117 | 10/1958 | Girton | 259—108 X |
| 3,201,095 | 8/1965 | Erwien et al. | 259—108 |

FOREIGN PATENTS 1,020,856  12/1957  Germany.

WALTER A. SCHEEL, *Primary Examiner.*

J. M. BELL, *Assistant Examiner.*